May 5, 1942.     C. D. LAKE     2,282,140
TIME RECORDER
Original Filed July 6, 1938     10 Sheets-Sheet 1

INVENTOR
Clair D. Lake
BY
ATTORNEY

May 5, 1942.  C. D. LAKE  2,282,140
TIME RECORDER
Original Filed July 6, 1938   10 Sheets-Sheet 2

FIG. 2.

INVENTOR
Clair D. Lake
BY
ATTORNEY

May 5, 1942.  C. D. LAKE  2,282,140

TIME RECORDER

Original Filed July 6, 1938   10 Sheets-Sheet 3

FIG. 3.

INVENTOR
Clair D. Lake
BY
ATTORNEY

May 5, 1942.  C. D. LAKE  2,282,140
TIME RECORDER
Original Filed July 6, 1938   10 Sheets-Sheet 5

May 5, 1942.   C. D. LAKE   2,282,140
TIME RECORDER
Original Filed July 6, 1938   10 Sheets-Sheet 6

INVENTOR
Clair D. Lake
BY
W. M. Wilson
ATTORNEY

May 5, 1942.   C. D. LAKE   2,282,140
TIME RECORDER
Original Filed July 6, 1938   10 Sheets-Sheet 7

INVENTOR
Clair D. Lake
BY
ATTORNEY

May 5, 1942.  C. D. LAKE  2,282,140

TIME RECORDER

Original Filed July 6, 1938   10 Sheets-Sheet 8

INVENTOR
Clair D. Lake
BY
ATTORNEY

May 5, 1942. C. D. LAKE 2,282,140
TIME RECORDER
Original Filed July 6, 1938  10 Sheets-Sheet 9

INVENTOR
Clair D. Lake
BY
ATTORNEY

May 5, 1942.  C. D. LAKE  2,282,140

TIME RECORDER

Original Filed July 6, 1938   10 Sheets-Sheet 10

INVENTOR
Clair D. Lake
BY
ATTORNEY

Patented May 5, 1942

2,282,140

UNITED STATES PATENT OFFICE 2,282,140

TIME RECORDER

Clair D. Lake, Binghamton, N. Y., assignor to International Business Machines Corporation, New York, N. Y., a corporation of New York Original application July 6, 1938, Serial No. 217,685. Divided and this application February 21, 1940, Serial No. 320,024

5 Claims. (Cl. 161—1)

This invention relates to improvements in time recorders and, more particularly, to recorders of the type used in printing a time registration upon the insertion of a card.

The general object of the present invention, which is divided out of my pending application Serial No. 217,685, now Patent No. 2,255,010, resides in the provision of an improved card recorder having positive driving means for all its various operations.

Another object of the invention is to provide a novel programming device by which minute regulation of the program operations of the recorder may be obtained and by which the same programming operation may be repeated after a two minute interval if a pre-arranged program so requires.

Still another object resides in the provision of novel means for shifting the card position horizontally and vertically with respect to a type wheel unit so that the card, when inserted in the card receiver, is maintained in alignment with the proper printing position according to a pre-arranged program so that a neat appearing time record is assured.

The present recorder is designed to reduce the time necessary for each employee to get his time of arrival or departure recorded on his card by the provision of novel automatic printing means which operates immediately when the employee inserts his card in a card receiver and exerts a slight downward pressure on the card. Also, means are provided for printing on the side of the card facing the operator so as to eliminate the time wasted in turning the card around to check the recording thereon, this time becoming of consequence when there is a long line-up of employees at the recorder around the noon hour or at closing time.

According to the invention, minute impulses from a synchronous motor, master clock, or other timing device cause the engagement of a clutching means so as to connect a type wheel unit and programming mechanism drive with the motor and cause the rotation of the motor to advance the minute type wheel and programming mechanism concurrently. The clutching mechanism controls further clutching means, according to a pre-arranged program, for initiating such functions as horizontal shifting of the card abutment and ribbon color shift. The mechanism for each of these operations is positively driven in both directions, the clutch drive mechanism rotating in the same direction, however, at all times. The minute type wheel, upon completing one revolution, trips carry mechanism of a type familiar in the art to advance the hour wheel one position, similar mechanism being used to advance the day wheel when the hour wheel has completed one revolution. The programming mechanism is adapted for minute regulation and the same programming operation may be repeated as often as two minute intervals. Interlocking means are provided to prevent printing while the type wheels are in motion or when a program shift is occurring. Also, printing occurs only once regardless of how long the card is held depressed in the card receiver, it being necessary to raise the card a certain amount and then depress it again to cause another printing operation. Customary ribbon spacing means cooperating with the printing operation and ribbon reversing means under the control of the ribbon are provided.

Other objects of the invention will be pointed out in the following description and claims and illustrated in the accompanying drawings, which disclose, by way of example, the principle of the invention and the best mode, which has been contemplated, of applying that principle.

In the drawings:

Fig. 12 is a sectional view taken along the line

12—12 in Fig. 11, showing the horizontal shift clutch mechanism.

Fig. 12a is a sectional view of one of the program disk attachable castings.

Fig. 12b is a detail plan view of a portion of the programming mechanism shown in Fig. 12.

Figures 5, 5A:
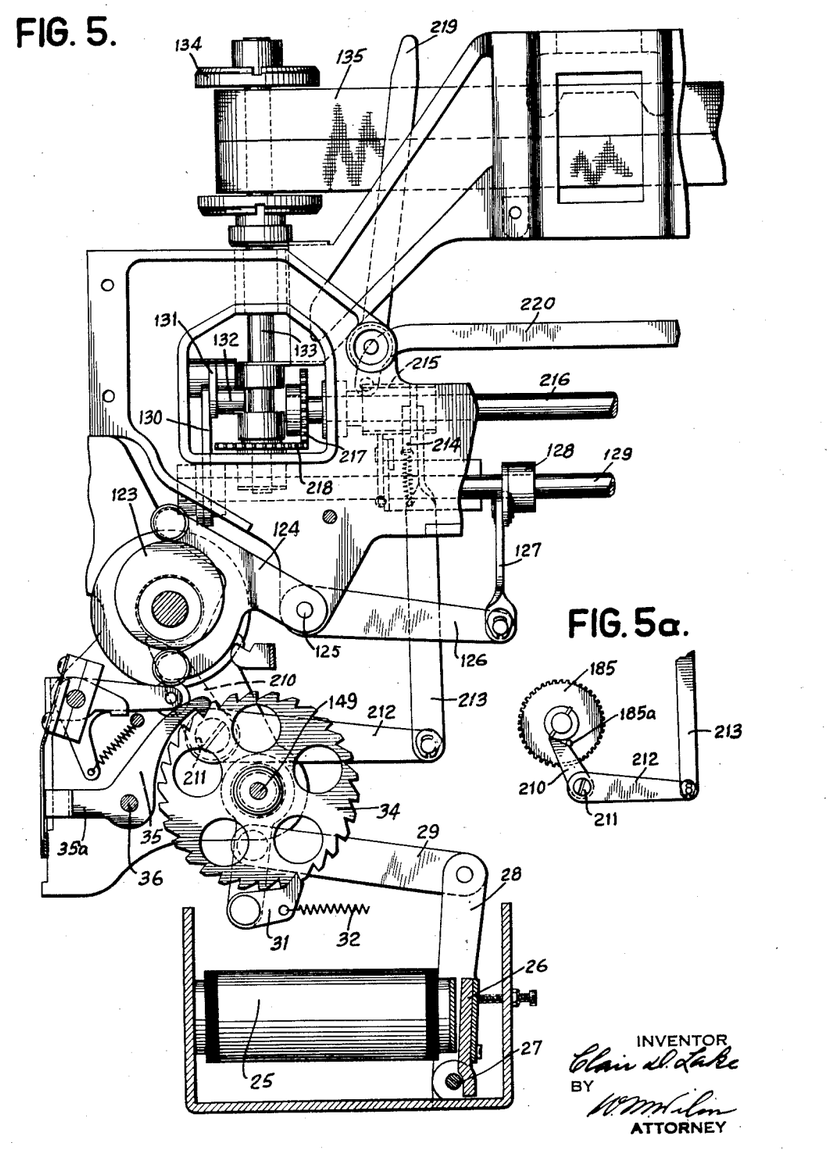
Fig. 5a is a detail view of a portion of the ribbon spacing mechanism.

Referring now to the drawings, particularly to Fig. 5, a control magnet 25 is energized once each minute by a brief impulse from a timing device such as a master clock (not shown), in a manner well known in the art. Magnet 25 controls the operation of the drive mechanism for a type wheel unit and programming device which will now be described.

Upon the energization of magnet 25, armature 26 is moved to the left about a pivot shaft 27, and an arm 28 fastened to the armature is thereby carried to the left. This motion is transmitted through a pivotally connected link 29 to an arm 30 on which is a pivoted feed pawl 31. Thus arm 30 and pawl 31 are moved to the left against the action of a spring 32. At the termination of the impulse which energized the magnet 25, the magnet becomes deenergized and the mechanism just described is restored to normal under the urging of spring 32. On the return stroke pawl 31 engages a ratchet wheel 34 so as to space this ratchet wheel one tooth in a counterclockwise direction. A detent 35 is provided to position ratchet wheel 34 after the spacing and at all other times to prevent backward movement of the same. During the spacing operation detent 35 rides up out of one tooth and into the next tooth, accomplishing this by rocking on its pivot 36. The detent 35, in rising out of a tooth of the ratchet wheel 34, rocks counterclockwise causing two operations to happen concurrently; namely, the closing of the motor circuit and the engaging of a clutch mechanism to connect the motor drive with a combined type wheel and program drive mechanism.

Figure 18:
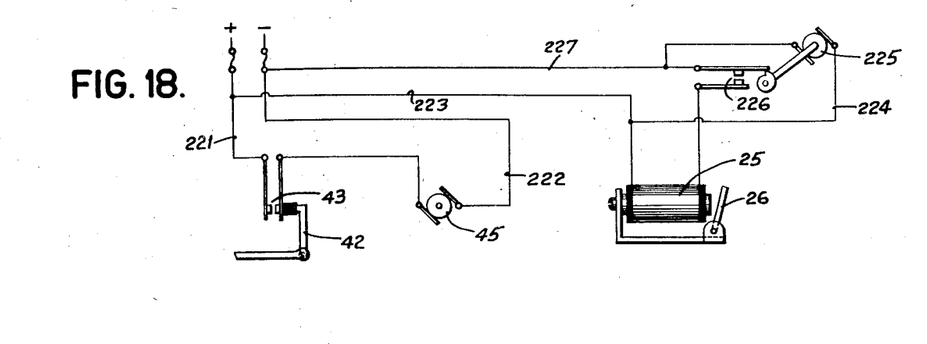
Fig. 18 is a schematic wiring diagram of the machine.

The motor circuit is closed by mechanism operated from an extension 35a on the detent 35. This extension, as it moves down, encounters a projection 39a (Fig. 2) on an arm 39 causing this arm to be depressed. An arm 40 associated with arm 39 is also depressed so that both of these arms move in a counterclockwise direction about a common pivot stud 41. Arm 40 is provided with a contact operating extension 42 which is moved to the left to close motor contacts 43 thereby to complete the motor circuit. This circuit will be described later in connection with an explanation of the wiring diagram of the machine (Fig. 18).

Figures 8, 8A, 8B, 9, 10:
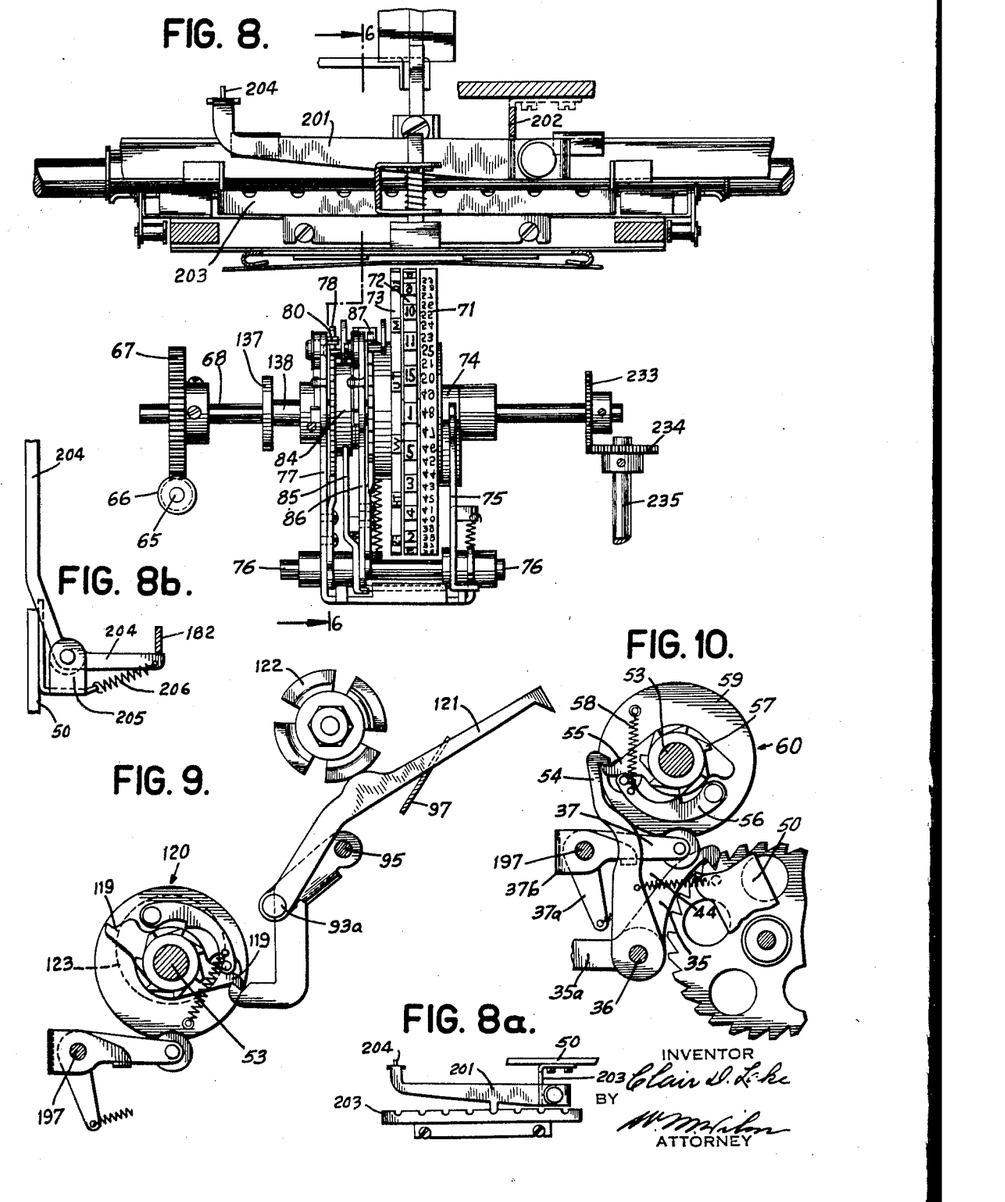
Fig. 8 is a plan view of the type wheel unit, card receiver, and print mechanism.
Figs. 8a and 8b are detail views of the print interlock mechanism.
Fig. 9 is a sectional view taken at 9—9 of Fig. 11 showing the ribbon color shift clutch mechanism.
Fig. 10 is a sectional view taken along the line 10—10 in Fig. 11 and shows the type wheel and program mechanism drive clutch and its associated operating mechanism.

The rocking motion of the detent 35 is also transmitted through its pivot shaft 36 to rock a latch arm 54 correspondingly (Fig. 10). Latch arm 54 moves to the left to release a latch 55 and permit a dog 56 to drop into engagement with a ratchet 57 under the urging of a spring 58. The latch 55 and the dog 56 are mounted upon the face of a cam 59, and the ratchet 57 is fixed to a shaft 53. Altogether, this mechanism forms the type wheel and program drive clutch, generally designated 60, which is now engaged.

The motor 45 (Fig. 3) now drives clutch 60 through one revolution in the following manner. A gear 47 is driven in a clockwise direction through a worm gear connection 46 by the motor 45. This rotation is transmitted through a shaft 48, a gear 49 affixed to the rear extremity thereof (Fig. 4), an idler gear 51, and a drive gear 52 to drive clutch shaft 53 so as to rotate clutch 60. At this time motor contacts 43 are held closed by a pivoted latch arm 38 (Fig. 2) which moved into a latching position under the action of a spring 38a when arms 39 and 40 were depressed so as to retain the arms in this position and thus keep the motor contacts 43 closed. However, as clutch 60 starts to rotate, a detent 37 (Fig. 10) rides out of a recession in the periphery of cam 59 and, in doing so, tends to move clockwise about shaft 197. In this movement, an extension 37a on the detent stretches a biasing spring 37c. An adjacent member 37b is fixed to shaft 197 and has an abutting connection with detent 37 which effects a clockwise movement of shaft 197. A latch arm 38 (Fig. 10) is fixed to the shaft at 38a and is thus also rotated, the bottom portion thereof being moved outwardly, or to the left as viewed in Fig. 10, so as to release arms 39 and 40. These arms, however, are held in their operative position by mechanism controlled by detent 37, which will be described hereinafter, so as to maintain motor contacts 43 closed for the major part of the cycle of revolution of clutch 60. Meanwhile, detent 35 and latch arm 54 are restoring to normal under the impetus of a spring 44. Consequently the clutch is latched up at the end of one revolution by the latch arm 54. The motor circuit is broken as a result of detent 37 dropping into the recession in the periphery of cam 59 once more at the end of the revolution. The manner in which the detent mechanism controls the motor circuit will be described later, it being sufficient for the present to state that as a result of dropping in of the detent 37, arms 39 and 40 are permitted to move upward and extension 42 to move to the right to open motor contacts 43.

During the above-mentioned revolution of the clutch 60, motor 45 is connected through this clutch to a type wheel and program mechanism drive which will now be described. As clutch cam 59 rotates, a gear 61 (Fig. 1) affixed to the rear face of this cam also rotates to transmit motion through an idler gear 62, gear 63 and beveled gear connection 64 to drive vertical shaft 65; then through spiral gear 66 and gear 67 to drive shaft 68 on which the type wheel unit is mounted (Fig. 8). A minute wheel 71 is fastened to the shaft 68 whereas an hour wheel 72 and a day wheel 73 are movably mounted on this shaft. The gear ratio of the drive mechanism just described is such that the minute type wheel 71 is advanced one position by the one revolution of the clutch 60. Graduations on this wheel read from 00 to 59. On the hour wheel 72, graduations read from 1 to 12 halfway around the wheel to represent a. m. and 1 to 12 for the other half to denote p. m. This method of underlining p. m. hours is a distinction familiar in the art. Upon one revolution of the minute wheel as a result of sixty minute advances, a mechanical carry is operated to advance the hour wheel 72 one position, and likewise upon one complete revolution of the hour wheel by means of 24 hourly advances, the day wheel 73 is advanced one position. The carry mechanism used is well known in the art and therefore will presently be described but briefly.

Figure 7:
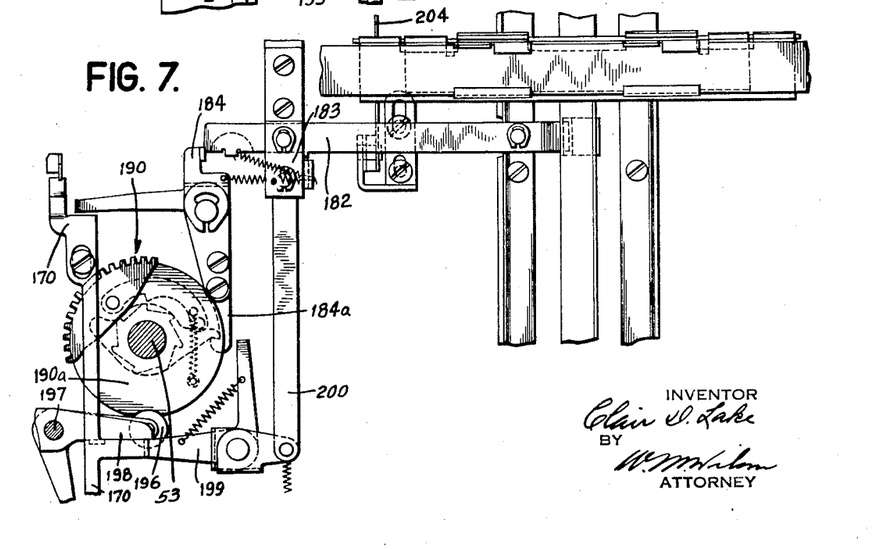
Fig. 7 is a sectional view taken along the line 7—7 of Fig. 11 showing the print clutch and operating mechanism associated therewith.

Affixed to the units type wheel 71 is a cam 74 provided with a cam follower 75 which is fixed to a shaft 76 so that this shaft is rocked as cam follower 75 rides up on the high point of cam 74. A carry lever 77 attached to shaft 76 is raised, and then, when the cam follower drops off the high point of cam 74, this carry lever is dropped suddenly into engagement with a rachet 78 causing the camming out of a detent pawl 79 (Fig. 7). Simultaneously, the ratchet 78 is fed one tooth by means of an ear 80 on a feed pawl 81 which rides under a stud 82 on the feed stroke and over this stud on the return. At all times, except when positively cammed out of position, detent 79 positions the hour wheel ratchet 78. The feeding of the ratchet 78 one tooth advances the hour wheel 72 one position, these two members being joined together by a sleeve connection. The day wheel 73 is advanced one position under the control of the hour wheel by means similar to the carry means just described. A cam 84 is fixed to the hour wheel ratchet 78 and is provided with a cam follower 85 which upon traversing the surface of the cam 84 operates a carry lever 86 (Fig. 8) causing this carry lever to cooperate with a ratchet 87 to advance the day wheel 73 one position for each complete revolution of the hour wheel 72. Carry lever 86 is similar to carry lever 77 already described but is freely mounted on shaft 76 rather than being fixed thereto. Both carry levers drop into engagement with their ratchets by gravity and the action of a spring such as the one designated 83 in Fig. 7.

Concurrently with the advancing of the minute type wheel by the drive mechanism described above, a large program disk 70 is shifted by the same mechanism. Program disk 70 (Fig. 1) is connected to the vertical shaft 65 by a spiral gear 69 on that shaft and the gear ratio is such that the disk is advanced one position for each revolution of the drive clutch 60, or in other words, one tooth movement of the disk 70 each minute. There are 360 teeth around the circumference of the disk, and a scale is provided showing five-minute readings and is numbered for every fifteen-minute reading. Disk 70 makes one revolution every six hours and therefore four revolutions in a day.

Mounted on the disk 70 are various castings 88 which may be spaced conveniently around the disk 70 in accordance with program requirements. The castings 88 are fastened to the disk by a screw 88a (Fig. 12a) and are fixed as to position by a pin 88b cooperating with screw 88a. The upper ends of castings 88 are slotted so as to permit them to receive insertible elements generally designated 89, and these inserts upon being positioned in the slots are retained there by flat springs 91. The top edges of inserts 89 have from one to four projections, each of which cooperates with one of four programming fingers 92 (Fig. 12b) at a differential time to initiate some operation for which the machine is programmed. It is understood that the elements 89 may be attached to the castings 88 or mounted in other ways than by the one just described, the insertion of the elements in slots on the casting being suggested simply as a convenient method of locating them.

In the machine disclosed herein, two operations are programmed directly from the program disk 70. These are the horizontal shifting of the card receiver to position the card for "morning in," "noon out," etc. time recordings thereon, and the color shifting of the ribbon so that out-of-program recordings are of a different color from those in program and are therefore easily distinguishable. Also, if it is desired that the "morning in," "noon out," etc. recordings be spaced vertically rather than horizontally on the card, the program disk 70 may be arranged to program the vertical shift of the card abutment for this feature. However, the machine disclosed is designed to space the daily record horizontally and the day-to-day change vertically on the card, and it is believed that from the description hereinafter it will become apparent to anyone familiar with the art how the machine could be changed to give a daily record down the card and a day-to-day change across the card.

Figures 12, 12A, 12B:
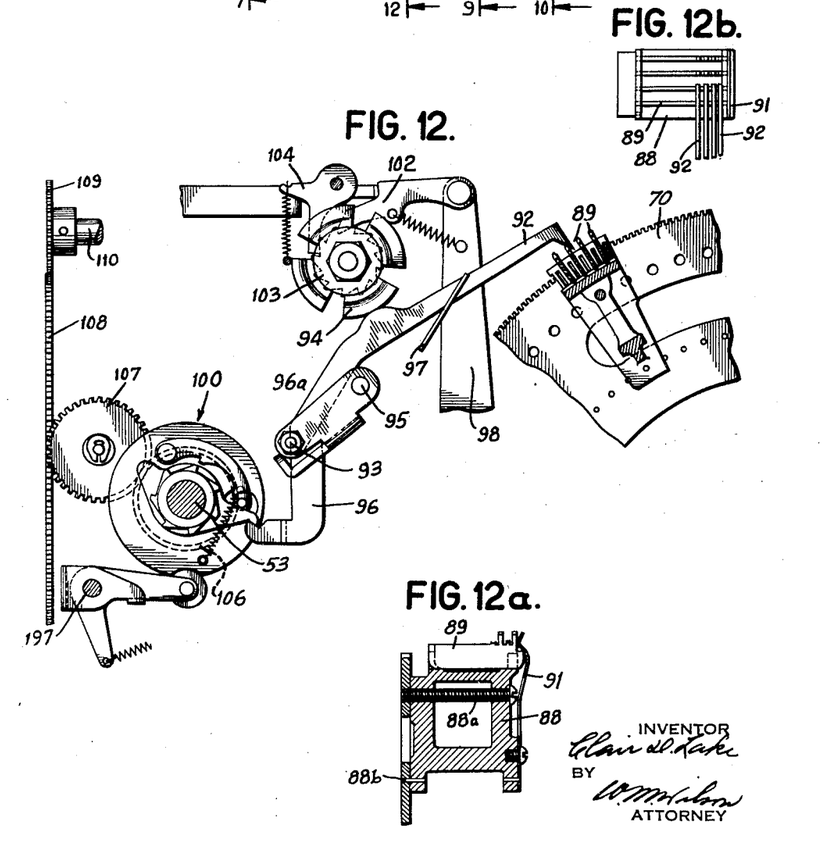

The mechanism which causes the horizontal shifting of the card receiver carriage in accordance with a prearranged daily program will now be explained with reference to Fig. 12. As a program finger 92 engages a projection on an insert 89, it tends to be raised upward, that is, in a counter-clockwise direction about its pivot shaft 93. However, if a four leaf cam 94 is so positioned at this time, in a manner to be described later, that it lies in the path of finger 92, then the result is that pivot 93 is rocked downwardly about an axis 95. This movement carries latch arm 96 to the right allowing the horizontal shift clutch, generally designated 100, to become engaged. Clutch 100 is a one revolution clutch similar to the drive clutch 60 already described. The consecutive slots on the castings 88 represent minute positions and the inserts 89 placed in these slots therefore cause programming operations to be initiated only on some minute and not between minutes. Thus, when clutch 100 is engaged from the program disk 70, clutch 60 is being engaged at the same time as the result of the energization of the control magnet 25 by a minute impulse. This means that the program disk, along with inserts 89, is shifted during the clutch revolution which follows so that the tip of arm 92 drops down into a space between inserts and thus permits latch arm 96 to restore to the left under the urging of a spring 96a so that it is positioned to latch up clutch 100 at the end of one revolution. A similar program operation may be repeated after a two minute interval because like inserts must be spaced at least that far apart so that the tip of arm 92 may drop down between the inserts properly to allow latch arm 96 to be fully restored to its latching position.

During the revolution of the horizontal shift clutch 100 after it has been tripped from the program disk as described above, motion is transmitted through a gear 106 on the clutch 100 and further gears 107, 108, and 109 to drive a horizontal shaft 110. This shaft has a double thread (Fig. 4) and is so designed that a cam follower 111a mounted in a bearing 111 of the card receiver carriage mechanism rides in one of the two threads of shaft 110 for one direction of carriage movement and is guided into the other thread on the return movement. Thus although the horizontal shaft 110 is rotated in the same direction for both directions of the carriage, the carriage is positively driven on the return just as it is positively driven in the normal direction.

The lead of the thread is such that the carriage is horizontally shifted a distance equal to one printing position for each operation of the horizontal shift clutch 100 from the program disk. The return of the card receiver carriage to the starting point may be effected under program mechanism control some time during the night or any convenient time previous to the next period in which time recordings are to be made.

Figure 11:
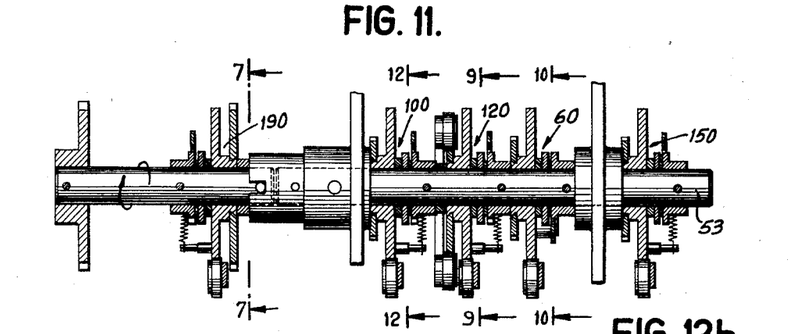
Fig. 11 is a detail view in section of the clutch unit, showing the relative location of the various drive clutches.

The color shifting of the ribbon is another operation which is initiated from the program disk. The ribbon 135 (Fig. 5) is double width, the upper half being of one color and the lower half of some contrasting color. In the particular machine disclosed blue and red are the colors employed to denote in-program and out-of-program recordings, respectively. When a color shift of the ribbon is initiated from a predetermined set-up of the program disk 70, a ribbon color shift clutch generally designated 120 (Fig. 11), which is similar to clutches 100 and 60 except for the fact that it is provided with two latch points, is tripped by the action of fingers 121 cooperating with a four leaf cam 122 which is exactly similar to the action of fingers 92 and cam 94 for the horizontal shift mechanism previously described. A pivot shaft 93a, similar to pivot 93, is rocked down about the axis 95 to cause the tripping of clutch 120 which, upon engagement turns only ½ revolution because latch 119 has two latch points 180 degrees apart. A complementary cam 123 moves with the clutch through this distance, this cam being provided with a double arm cam follower 124 (Fig. 5) which is fixed to the front of a pivot shaft 125 and has an arm 126 fastened to the other end of shaft 125.

Assuming that the two-color ribbon 135 is in the position shown in Fig. 5, in which position the upper half of the ribbon is operative in the printing operation to be described later, the rotation of cam 123 causes cam follower 124 to rock downwardly and arm 126 to rock upwardly. This raises a crank arm 128 thereby to rock shaft 129 to which the crank arm 128 is fixed. At the left extremity of shaft 129 is a link connection 130 which is raised, and carries a crank arm 131 up with it. Arm 131 is provided with a stud 132 interposed between the edges of two large diameter portions of the shaft 133 to which a ribbon spool 134 is attached, and thus as stud 132 is raised it raises shaft 133. At the right extremity of shaft 129 is a shaft 133a (Fig. 1) on which is a ribbon spool 134a and this shaft and spool are raised simultaneously with shaft 133 and spool 134 by similar mechanism (not shown). The ribbon 135 is wound on the spools 134 and is therefore moved up as the spools move up. The lower part of the ribbon is thus brought into an operating position so that all recordings made by the machine are of a color corresponding to the color of the lower half of the ribbon until the ribbon is lowered once more by further operation of the ribbon shift clutch 120, through one half a revolution. The lowering action is the reverse of the raising action, except that while positively lowering the ribbon complementary cam 123 rotates in the same direction as when raising the ribbon.

At this point it might be well to review the operation of the programming mechanism associated with the program disk 70, two general applications of which having been set forth above. It has ben shown that two things must occur simultaneously in order for a programming operation to be initiated from the program disk. That is, one of a group of four programming fingers such as 92 (Fig. 12b) must be cammed upward by a projection on the top edge of an insert 89, and on this movement be encountered by a leaf of cam 94 (Fig. 12) in order that a clutching means may be engaged to cause the motor 45 to drive the machine through some predetermined programming operation. The purpose of having four programming fingers and a four leaf cam for each separate programming feature hinges upon the fact that the program disk 70 makes four revolutions a day.

Suppose, for example, that it is desired to program the machine for a certain operation to occur at noon and midnight. One of the castings 88 is mounted so that an insert 89 placed in one of the slots located in the top thereof is aligned with the "12" hour reading on the program disk. In this case only two projections on the insert 89 would be necessary (Fig. 12a) and these aligned with the second and fourth program fingers from the rear respectively, assuming that the time of day when the disk 70 first moves the insert 89 under the tips of the program fingers 92 is 6:00 a. m. At this time the first or innermost leaf of the cam 94 is positioned in the path of the first program finger, but there is no projection on the insert 89 to operate this finger. The second finger is raised because it encounters a projection on the insert, but no leaf of the cam is situated in the path of this finger at this time. The third program finger from the rear is not encountered by a projection nor is there a leaf of the cam in alignment therewith. The fourth finger encounters a projection but not a leaf of the cam. Thus, the special operation is not initiated at 6:00 a. m. At noon the program disk 70 will have completed another revolution and the insert 89 is again brought in alignment with the program finger tips 92.

During the course of the revolution of the disk, the four leaf cam 94 is rotated counterclockwise a distance sufficient to bring the second leaf of the cam in alignment with the second program finger. This operation occurs as follows: an arm 98 is unlatched upon the energization of magnet 25 by motion transmitted through an arm 24 (Fig. 1) to a pivoted latch 23 which is rocked in a clockwise direction by the leftward movement of armature 26 so as to permit the bottom portion of arm 98 to be moved to the right under the urging of a spring 99. Arm 98, being pivoted at 101, the top of this arm moves to the left and a feed pawl 102 (Fig. 12) carried thereby engages a ratchet 103 so as to move this ratchet one tooth counterclockwise. A detent 104 is provided to position ratchet 103. Arm 98, once tripped, remains unlatched until a projection 105 mounted on the rear of disk 70 causes it to be latched up by camming the bottom of arm 98 to the left into a latching position on latch 23. Three such projections 105 are provided so that arm 98 is restored three times after having been tripped so that the ratchet 103 is spaced three times causing the four-leaf cam 94 to rotate one fourth of a revolution counterclockwise. This movement of the cam brings the succeeding leaf into operating position and moves the prior operating leaf away. Since the disk revolves once every six hours, it means that there is one fourth of a revolution of the four-leaf cam during this period. Thus each leaf is brought into operating position for a different six hour period of the day.

To continue with the example, at noon the two required conditions for a programming operation are met in that a projection on insert 89 cams the second program finger upward to be encountered by the second leaf of cam 94. This causes the engaging of the clutching means to connect the motor 45 to the mechanism for driving the machine through the special operation for which the machine was programmed. Then, at 6:00 p. m. the disk will have made another revolution but at this time although the third leaf of the cam 94 is positioned above the third program finger, there is no projection on the insert 89 to cam this finger upward. At midnight, however, the special operation is initiated by the proper movement imparted to the fourth or outermost program finger by a projection on insert 89 and the fourth leaf of the cam 94. In the above manner, therefore, the machine has been programmed for a certain operation to occur at noon and midnight. Obviously, if an operation is to take place several times within a six hour period, more castings 88 and inserts 89 must be positioned around the disk 70 in the proper locations.

In the machine disclosed, the vertical shift of the card abutment represents day-to-day changes, as was previously mentioned, and therefore this movement may be controlled from the hour type wheel 72, one complete revolution of this type wheel occurring once each day. The manner in which this is accomplished will now be described. A cam 137 (Fig. 8) is attached to the hour wheel ratchet 78 by a sleeve 138. A vertical arm 140 (Fig. 13) having a cam follower projection 139 and a supporting spring 141 at the upper end and a pivoted trip pawl 142 at the lower end. As cam follower 139 rides on cam 137 toward the high point of this cam, arm 140 is moved downwardly. Arm 142 rests against a portion of the frame 50, consequently the action of pawl 142 on the downward stroke of arm 140 is to rock clockwise about its pivot 143 so that the lower extremity of pawl 142 rides under the tip of an arm 144 connected to the latching arm 145 which is pivoted at 145a. This is the position shown in Fig. 13, cam follower 139 having risen on the high point of cam 137 at this time.

Then, upon slightly further movement of the cam 137, cam follower 139 drops off the high point and arm 140 moves upward under the impetus of spring 141 and as it does so pawl 142 catches on the top of arm 144 and raises this arm. This action causes arm 145 to move to the right thereby tripping the clutch generally designated 150. Clutch 150 is a one revolution clutch similar in construction to the other clutches on shaft 54 (Fig. 11) so that no further description of the clutch itself is deemed necessary. A gear 150a on the rear of the clutch is now driven by motor 45 and motion is transmitted through an intermediate gear 147 (Fig. 1) to gear 148 which is fixed to a shaft 149. Shaft 149 protrudes through the hub of ratchet wheel 34 which is loosely mounted thereon and through a portion of the supporting frame of 50 (Fig. 19) and has on its rear extremity a bevel gear 151 which engages a bevel gear 152 (Fig. 3) on a horizontal shaft 153. Shaft 153 is supplied with a bevel gear 154 at one extremity and 154a at the other. These gears connect horizontal shaft 153 with vertical shafts 156 and 156a through beveled gears 155 and 155a respectively on these vertical shafts. The purpose of having two vertical driven shafts is to prevent binding. Both shafts are double threaded so that rotation of the shafts in one direction is used both for raising and lowering the abutment generally designated 160. The principle employed here is the same as explained for the horizontal shaft 110 drive, namely, a thread follower 160a which follows one thread while the abutment is moving up and shifts to the other thread to drive the abutment down. The lead of the thread is such that the card is raised to the succeeding day's printing position for each tripping of the clutch 150. When the abutment 160 has reached its uppermost position at the end of the weekly period and the programming mechanism operates to shift the day wheel ahead to the first day of the next weekly period, it becomes necessary to keep clutch 150 engaged and allow motor 45 to drive shafts 156 and 156a until the abutment 160 is restored to its lowermost position. The mechanism for accomplishing this will now be explained with reference to Fig. 2.

Figure 2:
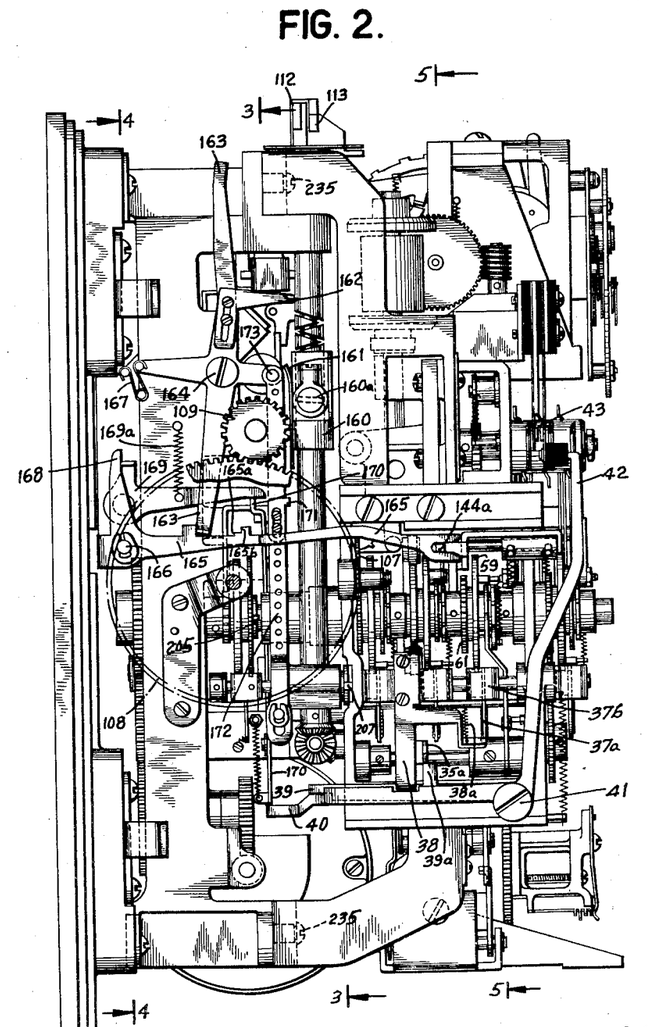

As abutment 160 nears its uppermost limit of its travel a trip 161 fastened to the abutment 160 engages an operating arm 162 on a lever 163 and causes extension 162 to be raised so as to rock the lever 163 counterclockwise about its pivot 164. Thus the lower tip of lever 163 is moved to the right and cams downwardly an arm 165 which is pivoted on a stud 166. Lever 163 assumes a position in which its lower tip is flush with a step 164a on arm 164. The movement of the lower tip of lever 163 to the right, after being initiated by the action of trip 161 against operating arm 162, is furthered by the urging of a hairpin spring 167. Then, upon the operation of latch arm 145 to engage clutch 150 as previously described, an extension 144a of arm 144 is rocked downwardly. Extension 144a protrudes through the forked end of arm 165 so that the latter is moved downwardly as well. The lower tip of arm 163 is then moved to the next step 165b on arm 165 by the action of spring 167. In this position of arm 165, the latch arm 145 is held so that it cannot latch up the clutch 150. The clutch, once engaged, continues to drive shaft 156 and 156a, and the abutment 160 moves downwardly because the thread followers 160a have reached the end of the up thread and are guided in the down thread of these shafts. Besides keeping the clutch 150 engaged, however, it is necessary to keep the motor circuit closed in order to drive the abutment 160 back to its starting point. This is accomplished by a mechanical arrangement co-operating with an extension 168 on the arm 165 which is moved to the left as arm 165 is moved downwardly thereby causing a bell crank 169 to be rocked clockwise so as to force arm 170 down. The lower tip of arm 170 on its downward travel engages arm 40 and causes the latter arm to move down, thus transmitting leftward movement to contact operating arm 42 to close the motor contacts 43.

As abutment 160 nears its lowermost limit of travel, the lower end of trip 161 strikes against an operating projection 171 on an arm 172 forcing this arm downwardly. Arm 172 is pivotally connected to lever 163 by a stud 173, and therefore the lower tip of lever 163 is moved back to the left allowing arm 170 to rise as bell crank 169 rocks back to the left under the action of its spring 169a. Thus, arm 40 is permitted to move upwardly and contact operating arm 42 to move to the right to open the motor contacts 43 thereby breaking the motor circuit. Concurrently, the arm 165, in moving upwardly, allows extension 144a to move in the same direction so that latch arm 145 moves into normal position to latch up clutch 150 at the end of a revolution.

Figure 6:
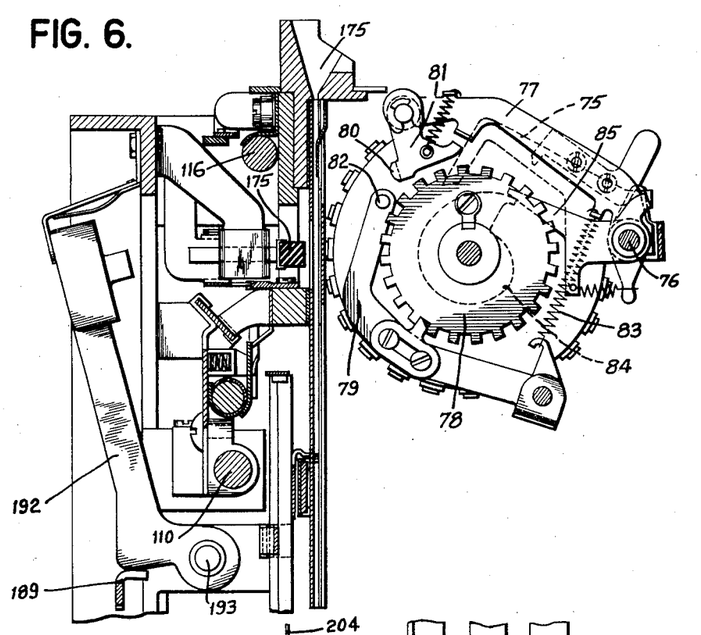
Fig. 6 is a sectional view taken generally along the line 6—6 of Fig. 8.

Now considering the machine from the operator's standpoint, when an employee manually inserts his time card into a card receiver 175 (Fig. 3) and lowers it until its bottom edge forces a pair of bail operating ears 176 down so as to rock the bail 177 (Fig. 15) to the rear about its pivot shaft 178, an automatic printing operation is initiated as follows: Bail 177 operates another bail 179 which is pivoted at each end to a support generally designated 180 and is positioned at right angles to bail 177. Motion is transmitted through an attachment 181 on bail 179 to carry horizontal arm 182 to the right. Arm 182 slides in a guide 183 and rests against the upper tip of a latching arm assembly 184 (Fig. 7). Consequently, as arm 182 is moved to the right, latching arm assembly 184 is rocked in a counterclockwise direction so that the lower end 184a moves to the right and trips the print clutch assembly generally designated 190 which is mounted on clutch shaft 53 along with the rest of the clutches already described. Latching arm 184 also causes arm 170 to move down at this time to close the motor contacts to start the motor. A gear 185 (Fig. 3), mounted on the face of clutch 190, engages with a gear 186 which is fixed to a shaft 187. Shaft 187 protrudes through a portion of the frame 50 (Fig. 4) and has a cam 188 fixed to its rear extremity. A cam follower 188a rides on cam 188 and is urged in firm contact with the cam by a spring 189. Immediately after cam 188 begins to rotate, cam follower 188a drops off the high point of the cam under the urging of spring 189. The cam follower being pivoted on a stud 191 the other end of the cam follower will move up sharply against the base of the hammer 192 causing the top portion of the hammer to fly toward the front (Fig. 6). The hammer is pivoted on a shaft 193 and strikes a blow on a plunger 194 to force a platen 195 toward the type wheels to effect a printing operation on the card.

Meanwhile the printing clutch 190 continues to rotate through one revolution. A detent roller 196 (Fig. 7) rides out of the depression in the clutch cam 190a and as it does so it transmits motion through a short shaft 197 to a pair of similar arms 198 (one behind the other). The front arm of the pin bears down on arm 170 to keep motor contacts 43 closed through mechanism already described and the rear arm of the pair depresses one end of lever 199 so that the other end of this lever is moved upwardly and, through a link 200, raises arm 182 above the tip of latch arm assembly 184. The purpose of this is to keep the motor running to drive the print mechanism through one revolution and to provide means to prevent more than one printing operation for each operation of the bail 177 by the time card as previously described.

Figures 13, 14, 15:
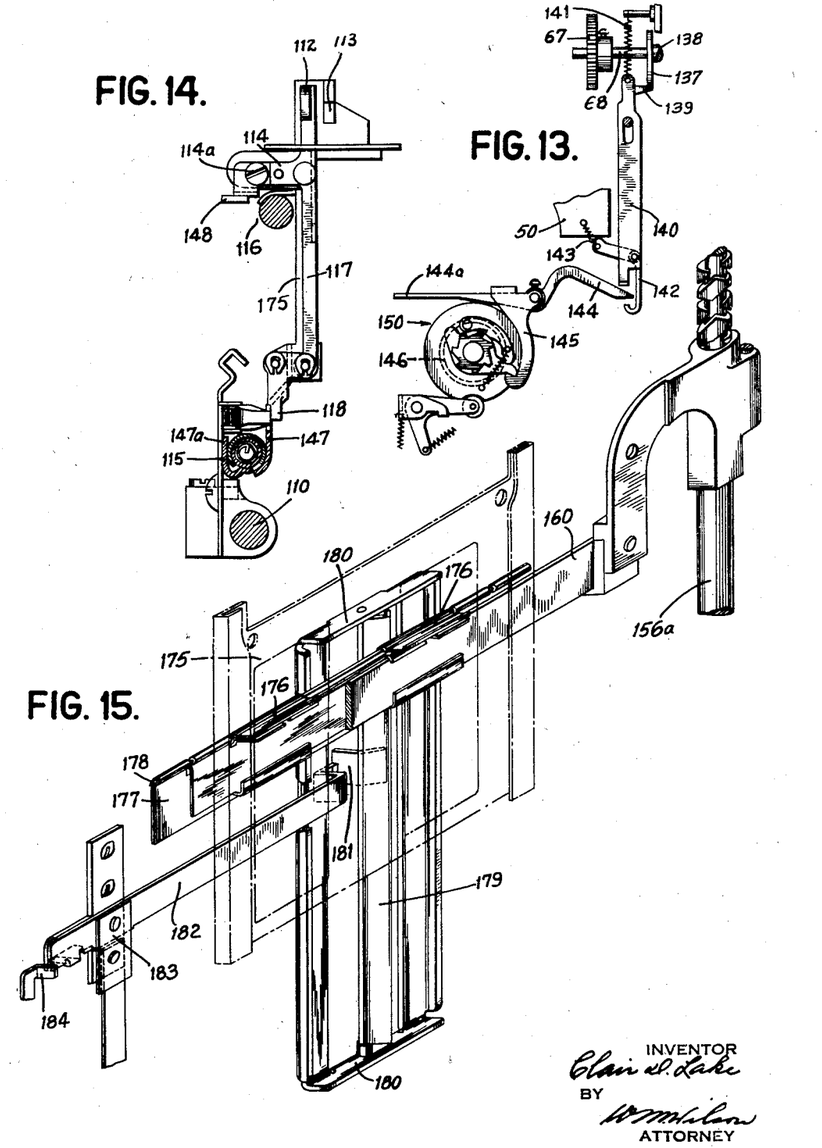
Fig. 13 is a front elevation detail view of the vertical shift clutch and its associated trip mechanism.
Fig. 14 is a side view partly in section of the card receiver carriage.
Fig. 15 is a perspective view of the card receiver.
Figure 16:
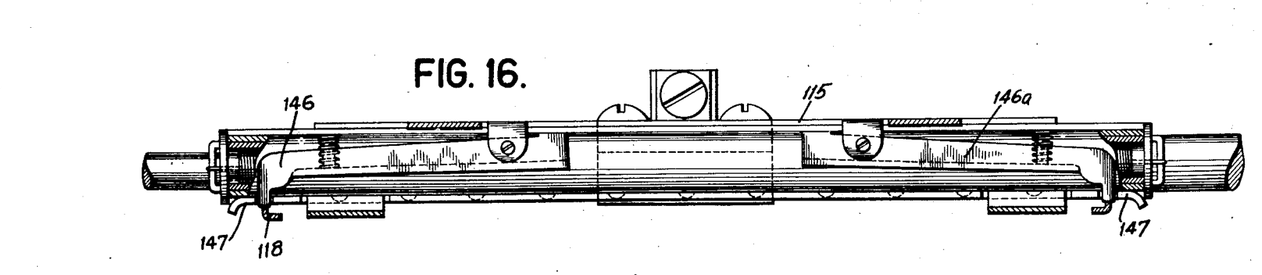
Fig. 16 is a plan view of the carriage in detail.
Figure 17:
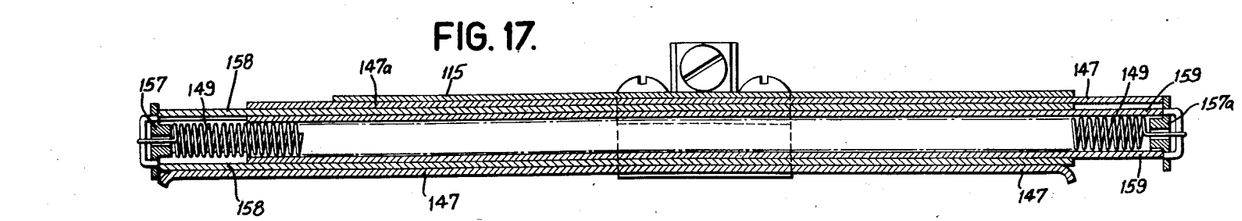
Fig. 17 is a sectional view of the carriage shown in Fig. 18.

Returning now to the card receiver carriage mechanism, the horizontal drive for which through shaft 110 was already described, it is seen from the view shown in Fig. 14 that the lower part of card receiver 175 is connected to a carriage tubing assembly and a plate 115, and the upper part of the card receiver rides along a guide rail 116. The carriage tubing assembly provides means to manually move the card receiver 175 temporarily to an out-of-program printing position. This is accomplished by first operating small levers located at the top of the card receiver 175 on either side. The operator by squeezing lever 112 against projection 113 (Fig. 14) causes the rockable member 114 pivoted at 114a to be rocked clockwise forcing link 117 down thus moving bell crank 118 clockwise about its pivot so as to force an arm 146 (Fig. 16) back within the walls of a carriage tubing supporting plate 147. A bail 148 connects the operating mechanism for bell crank 118 with similar operating mechanism for another similar bell crank at the opposite end of the card receiver so that arm 146 (Fig. 16) is also forced back within tubing support plate 147. The card receiver may now be manually moved into the desired printing position in either direction against the action of a spring 149 (Fig. 17). One end of this spring is attached to a washer 157 which covers one end of a tubing 158, and the other end of the spring 149 is attached to a washer 157a which covers the end of a tubing 159. Upon manual movement of the card receiver to the left tubing 158 is carried to the left along with plate 147 thereby extending spring 149 in the manner shown in Fig. 17. The remaining parts of the carriage remain in their normal position on the horizontal shaft 110. Upon manual movement of the card receiver to the right, tubing 159 along with plate 147 is carried to the right extending spring 149 and leaving the remaining parts of the carriage in their normal position. Thus, when the hand of the operator is released from the card receiver it returns automatically to its normal "in-program" position under the urging of spring 149. It will be noted in connection with the relative movement between the card receiver and the lower carriage mechanism that the tubing assembly has two support plates 147 and 147a. Plate 147a is secured to plate 115 which in turn is fastened to a bearing 111. Plate 147 is, as previously described, fastened to the card receiver. The fact that the support for the tubing is split into two plates permits the operation of the carriage tubing just described to make possible the manual shifting of the card receiver for a desired out-of-program registration.

It might be well to mention at this time that although the card receiver may be manually shifted out of program that printing cannot be effected unless the card receiver is held in some printing position. This is controlled by a mechanical interlock between the print clutch trip mechanism and the card receiver. The mechanism for this includes a pawl 201 (Figs. 8a, 8b) which is pivoted attached to a bracket 202 on a portion of the frame 50. This pawl has a single tooth which rides along a slotted member 203 on the card receiver as the card receiver is moved. Upper end of a bell crank 204 rests against the tip of pawl 201 and the lower end is normally positioned under arm 182. Bell crank 204 is pivotally mounted on a bracket 205 which is attached to the frame 50. A spring 206 attached to the bracket and bell crank, urges the bell crank to rock in a clockwise direction about its pivot. When the tooth of pawl 201 is not in a slot of the member 203, however, pawl 201 rocks bell crank 204 counterclockwise (Fig. 8b) to raise arm 182 above the tip of printing clutch latch arm 184 (Fig. 7) so that the print clutch cannot be tripped. Thus only when pawl 201 is seated in one of the slots of member 203, or in other words, only when the card receiver is in some printing position can the print clutch be tripped to initiate a printing operation.

On each printing operation the ribbon is spaced one position by a pin 185a (Fig. 5a) on print gear 185 which strikes a lever 210 fixed to a shaft 211 so as to rock this shaft and through an arm 212 raise a link 213 (Fig. 5) to impart a feed stroke to a pawl 214 which engages a ratchet 215 attached to a shaft 216. Shaft 216, through gears 217 and 218, drives ribbon shaft 133 to space the ribbon. The ribbon reverse mechanism is controlled by the ribbon or manually by the shifting of a pair of levers 219 (one of which is shown in Fig. 5) connected by a link 220. These levers perform the function of shifting shaft 216 to the right or left so as to engage or disengage gear 217 with gear 218. When shaft 216 is shifted to the right a gear similar to 217 on the other end of shaft 216 meshes with a gear similar to 218 on ribbon shaft 133a (Fig. 1) to drive the ribbon in the reverse direction. The ribbon reverse mechanism is old in the art and no further explanation is believed necessary.

Interlocking means are provided to prevent the possibility of a printing operation from taking place while the type wheels are in motion or while some program shift operation is occurring. Should an employee insert his time card in the card receiver in the usual manner at a time when a program operation is occurring, no registration will be made, thus doing away with blurred or out-of-column printing. This is accomplished in a simple manner as follows: Each of the clutches on the clutch shaft 53 are provided with a detent arm and roller and are loosely mounted on a common shaft 197. The operation of each of these detent arms are similar, therefore the one associated with the type wheel and program clutch 60 will be described as representative (Fig. 10). The detent arm 37 is forced down as its roller rides out of the recession in the periphery of the cam 59 as previously described. Arm 37 is loosely mounted on shaft 197 but a detent bracket 37b is fixed to this shaft. Shortly after arm 37 has begun its downward movement it encounters a projection on bracket 37b and consequently shaft 197 rocks slightly in a clockwise direction. Referring now to Fig. 7, it will be remembered that a pair of arms 198 are fixed to the shaft 197 and therefore are rocked downwardly. The same mechanism which was already described for preventing more than one printing operation each insertion of a time card in the card receiver is now employed to prevent printing while the program operation is occurring. That is, the rear arm of the pair 198 bears down on lever 199 to cause link 200 and arm 182 to be raised. Arm 182 in its raised position clears the top of latch assembly 184, and therefore the print clutch 199 cannot become engaged. It will be noted that the front arm of the pair 198 forces arm 170 down to keep the motor contacts closed during the revolution of any of the program clutches. At the end of a revolution the roller on the end of the detent arm 37 seeks the recession in the periphery of cam 59 under the urging of its spring and the mechanism including arms 170 and 182 are restored to normal.

Figure 19:
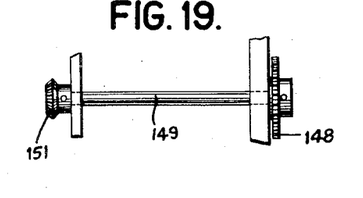
Fig. 19 is a side view of a portion of the vertical shift drive mechanism.

The circuit diagram of the machine as set forth in Fig. 19 is very simple. The closing of motor contacts 43 completes a circuit through the motor from positive line, wire 221, motor contacts 43, motor 45, wire 222, to negative line. A timing device such as synchronous motor 225 is connected directly across the line so as to be continuously running by a circuit from positive line, wire 223, wire 224, synchronous motor 225 via wire 227 to negative line. The synchronous motor 225 operates cam contacts 226 closing these contacts once each minute for a brief interval of time. The closing of contacts 226 establishes a circuit to energize magnet 25 as follows: Positive line wire 223, magnet 25, contacts 226, via wire 227 to negative line.

Figure 1:
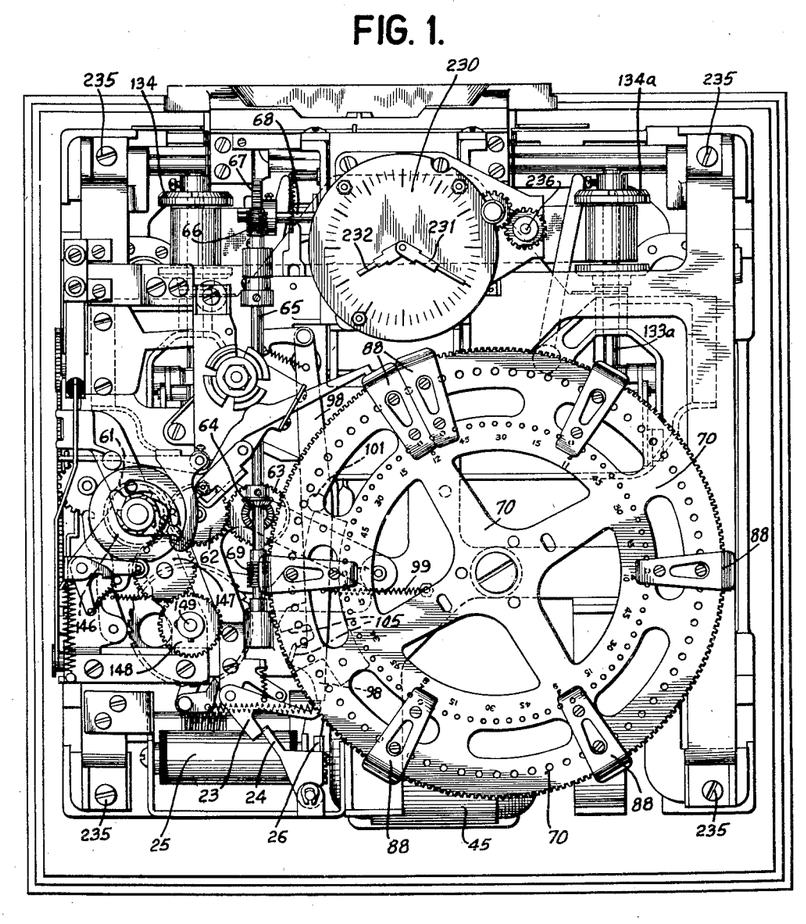
Figs. 1 and 2 are front and side elevation views of the machine, respectively, showing the relative location of the various parts.

A clock face 230 may be provided as shown in Fig. 1, the minute hand 231 for which is driven through suitable gear reduction from type wheel shaft 68 (Fig. 8) to which it is connected by gears 233 and 234 and shaft 236. The front end of shaft 234 is shown in Fig. 1 and the gear drive from this shaft to the minute hand is such that the minute hand is moved ahead one minute graduation for each advance of the minute type wheel. The hour wheel 232 is moved slightly ahead at the same time by simple gear reduction familiar in the art.

Figure 3:
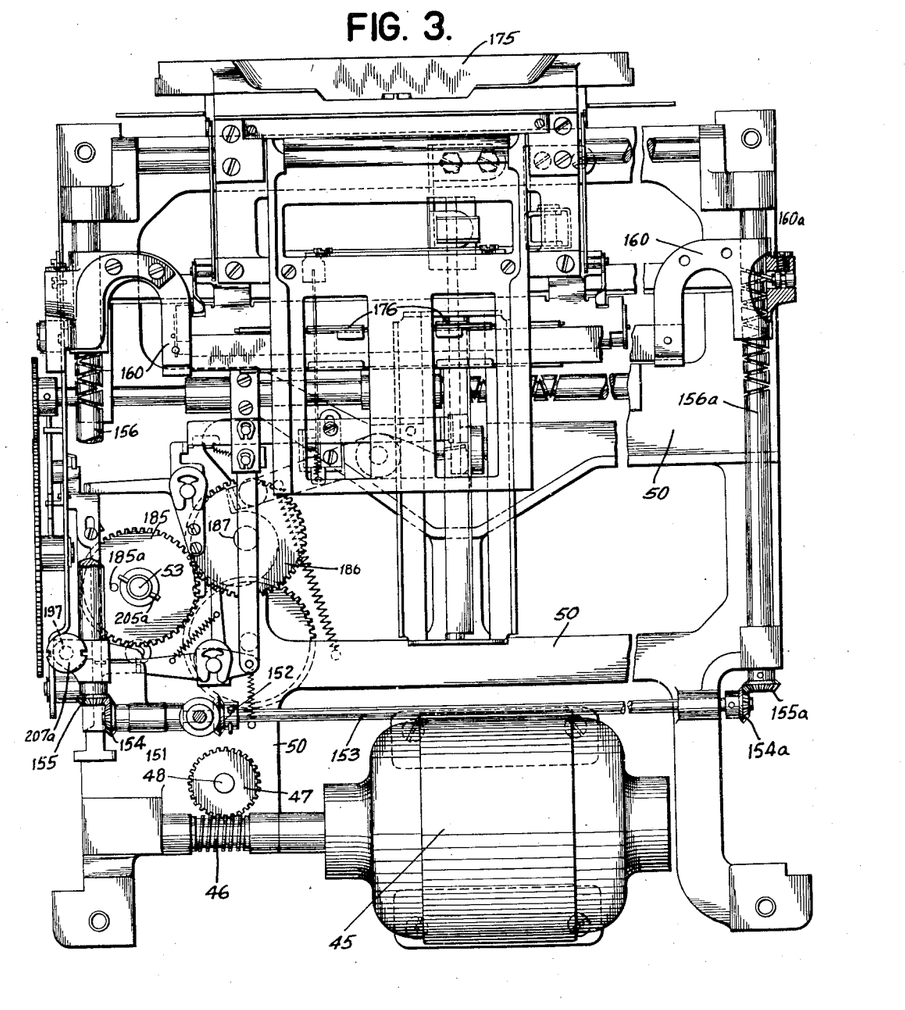
Figs. 3, 4, and 5 are sectional views of the machine taken in the directions 3—3, 4—4, and 5—5, respectively of Fig. 2.
Figure 4:
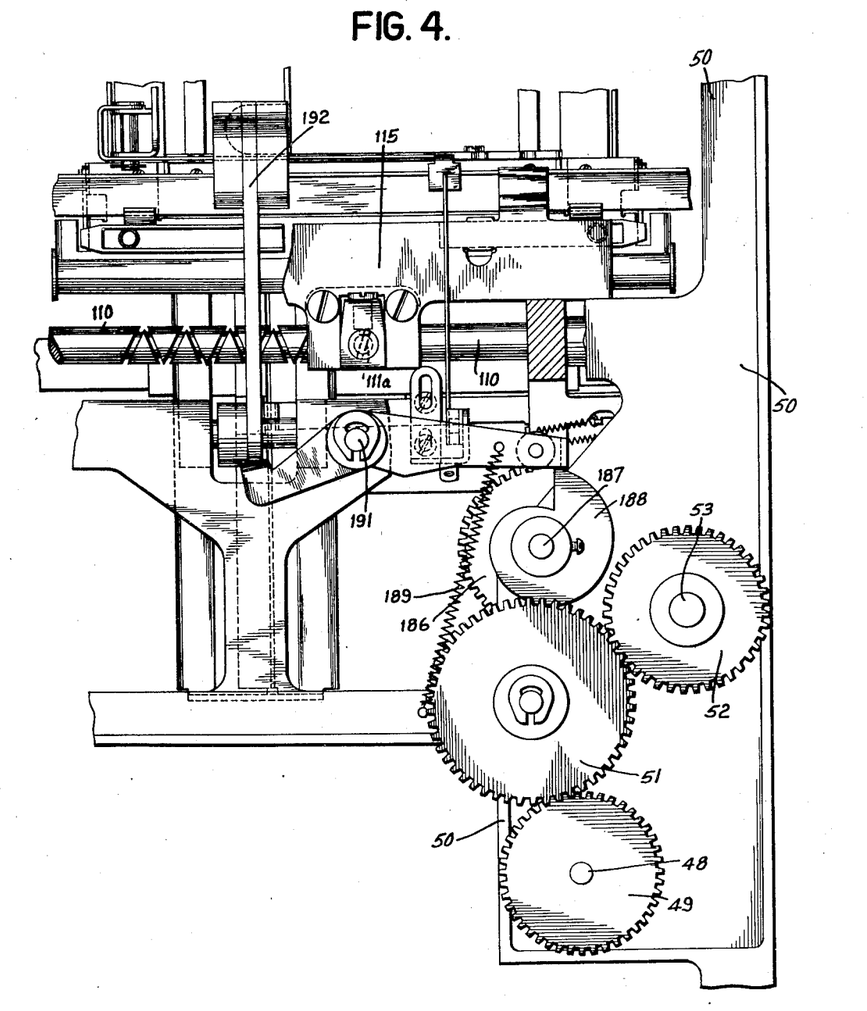

The general construction of the machine provides for removal of the front part including the type wheel unit and clock, program mechanism, clutches and magnet assembly as a unit by the loosening of four screws 235 (Fig. 1). The remaining part of the machine, which is shown in Fig. 3 is then easily accessible for repair or replacement of parts. The above disassembly can be accomplished because of the fact that the clutch shaft 53 and the detent shaft 197 are broken and a coupling inserted in each. These couplings are designated 205 and 207 respectively (Fig. 2). In replacing the front portion of the machine, it is necessary to first connect these couplings and see that bevel gear 151 meshes with bevel gear 152 (Fig. 2) properly and then replace the four screws 235. The male member 205a of the clutch shaft coupling 205 and the female member 207a of the detent shaft are shown in Fig. 3.

Reviewing now briefly the operation of the machine, it has been shown how a minute type wheel and a program disk are advanced one position as a result of the engaging of a drive clutch under the control of a magnet which is energized by an impulse sent to it each minute by a timing device. The hour and day wheels, unlike the minute wheel, are freely mounted on a type wheel unit shaft and moved thereabout by spring carrying mechanism. The program disk makes one revolution every six hours and cooperates with programming fingers and cams to control further clutching means, causing such machine operations to occur as are pre-arranged according to a required program. The programming operations include horizontal shifting of the card receiver carriage, ribbon color shift, and vertical shifting of the card abutment. Each of these operations is positively driven in both directions and the direction of the drive remains the same at all times. The programming mechanism is adapted for minute regulation and the re-occurrence of the same program operation after a two minute interval. Printing is automatic and occurs upon the insertion of a time card in the card receiver and the exertion of a slight downward pressure on the card which causes the tripping of a print clutch to effect a printing operation. The usual ribbon spacing and reversing mechanism is provided and operates on the print cycle.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A program device for scheduling the operation of an associated mechanism for a predetermined time period comprising a rotatable disk and control elements attachable thereto at various points in accordance with a desired program, means for rotating said disk at a timed rate, a plurality of sensing fingers mounted adjacent the disk for sensing the control elements during the rotation of said disk, a rotatable cam having a plurality of leaves spaced apart along the axis of rotation of said cam so as to place each of said leaves in alignment with one of the sensing fingers, the leaves also being spaced circumferentially about said cam so that only one of said leaves is in engageable relation with its related sensing finger at a time to cause operation of the associated mechanism as said device senses a control element, and means actuated by the disk upon completing each revolution to rotate the cam so as to bring a different one of said leaves into engageable relation with its related sensing finger for the next revolution of the disk, said disk being rotated during said predetermined time period through a number of complete revolutions equal to the number of said cam leaves, whereby all of said leaves are brought into engageable relation with their related sensing fingers within the predetermined time period.

2. A program device for scheduling the operation of an associated mechanism for a predetermined time period comprising a rotatable disk and control elements attachable thereto at various points in accordance with a desired program, a timing motor for driving said disk a plurality of feeler arms extending into the path of the control elements for engagement thereby during rotation of the disk, a shiftable cam having a plurality of spaced operating surfaces one for each feeler arm, said operating surfaces also being spaced circumferentially about said cam so that only one of the operating surfaces is capable of engaging its related feeler arm at a time to effect operation of the associated mechanism as the latter arm is engaged by a control element, and means actuated by the disk upon rotating a predetermined distance to shift the cam so as to bring another of said operating surfaces into engageable relation with its related feeler arm for another predetermined amount of rotation of the disk, whereby all of said operating surfaces are brought into engageable relation with their related feeler arms within the predetermined time period.

3. A program control unit for scheduling the operation of an associated mechanism for a predetermined time period, comprising a rotatable carrier and control elements attachable thereto at various points in accordance with a desired program, means for rotating said carrier chronometrically, a plurality of sensing devices extending into the path of said elements for engagement thereby during the rotation of said carrier, a shiftable cam having a plurality of spaced operating surfaces one for each sensing device, said operating surfaces being also spaced circumferentially about said cam so that only one of the operating surfaces is capable of engaging its related sensing device at a time to effect operation of the associated mechanism as the latter device is engaged by a control element, and means actuated by the carrier upon rotating a predetermined distance to shift said cam so as to bring another of said operating surfaces into engageable relation with its related sensing device for another predetermined amount of rotation of the carrier, whereby all of said operating surfaces are brought into engageable relation with their related sensing devices within the predetermined time period.

4. A program device for scheduling the operation of an associated mechanism for a predetermined time period comprising a rotatable disk and control elements attachable thereto at various points to set up a desired program, means for rotating said disk at a timed rate, a pivoted arm extending into the path of said elements during the rotation of said disk, a movable cam capable of engaging said arm to cause operation of the associated mechanism as said arm is engaged by a control element, and means controlled by the disk for moving the cam into and out of engageable relation with said arm during the predetermined time period.

5. A program device for scheduling the operation of an associated mechanism for a predetermined time period comprising a rotatable disk and control elements attachable thereto at various points to establish a desired program, means for rotating said disk in time sequence, an elongated seeker arm having one end extending into the path of said elements during the rotation of said disk for engagement thereby and being provided with a yieldable pivot at the other end, and a cam movable into engageable relation with said arm at a point intermediate the ends of said arm within the predetermined time period under control of the disk to restrain the normal movement of the arm about its pivot as it contacts a control element, thereby causing movement of said pivot to effect operation of the associated mechanism.

CLAIR D. LAKE.